United States Patent
Brooks et al.

(10) Patent No.: US 11,845,143 B2
(45) Date of Patent: Dec. 19, 2023

(54) OPTICAL DESIGN FOR A TWO-DEGREE-OF-FREEDOM SCANNING SYSTEM WITH A CURVED SAMPLE PLANE

(71) Applicant: University of Rochester, Rochester, NY (US)

(72) Inventors: Daniel R. Brooks, Rochester, NY (US); Jonathan D. Ellis, Tuscon, AZ (US)

(73) Assignee: University of Rochester, Rochester, NY (US)

( * ) Notice: Subject to any disclaimer, the term of this patent is extended or adjusted under 35 U.S.C. 154(b) by 1018 days.

(21) Appl. No.: 16/629,199

(22) PCT Filed: Jul. 6, 2018

(86) PCT No.: PCT/US2018/040974
§ 371 (c)(1),
(2) Date: Jan. 7, 2020

(87) PCT Pub. No.: WO2019/010345
PCT Pub. Date: Jan. 10, 2019

(65) Prior Publication Data
US 2020/0223009 A1    Jul. 16, 2020

Related U.S. Application Data

(60) Provisional application No. 62/529,536, filed on Jul. 7, 2017.

(51) Int. Cl.
*B23K 26/082* (2014.01)
*B23K 26/0622* (2014.01)
(Continued)

(52) U.S. Cl.
CPC ........ *B23K 26/082* (2015.10); *B23K 26/0624* (2015.10); *B23K 26/0648* (2013.01);
(Continued)

(58) Field of Classification Search
CPC .............. B23K 26/082; B23K 26/0624; B23K 26/0648; G02B 13/0005; G02B 13/0095;
(Continued)

(56) References Cited

U.S. PATENT DOCUMENTS

2008/0083886 A1*  4/2008  Faklis ................ G02B 27/0972
                                                          250/504 R
2009/0287306 A1* 11/2009  Smith ................. A61F 9/00804
                                                            623/6.17
(Continued)

FOREIGN PATENT DOCUMENTS

WO     2007002231 A1    1/2007
WO    20080033750 A1    3/2008
(Continued)

OTHER PUBLICATIONS

Brooks et al. (2014) "Precision large field scanning system for high numerical aperture lenses and application to femtosecond micromachining of opthalmic materials," Review of Scientific Instruments 85 (6):065107.
(Continued)

*Primary Examiner* — Nathaniel E Wiehe
*Assistant Examiner* — Theodore J Evangelista
(74) *Attorney, Agent, or Firm* — Andrew J. Anderson, Esq.; Harter Secrest & Emery LLP

(57) ABSTRACT

A pre-objective two-degree-of-freedom galvanometer scanning system including two galvo mirrors (111,112) with an optical relay (120) between the mirrors (111,112) and a microscope objective (130) with a curved image plane (140) is presented. The second galvo mirror (112) is located in the aperture stop before the objective. The optical system enables scanning in both directions over the full, curved field
(Continued)

for creating custom refractive structures across the 6.5 mm optical zone of contact lenses using femtosecond micro-modification.

19 Claims, 7 Drawing Sheets

(51) Int. Cl.
  *B23K 26/06* (2014.01)
  *G02B 13/00* (2006.01)
  *G02B 26/10* (2006.01)
  *G02B 27/00* (2006.01)

(52) U.S. Cl.
  CPC ..... *G02B 13/0005* (2013.01); *G02B 13/0095* (2013.01); *G02B 26/101* (2013.01); *G02B 26/105* (2013.01); *G02B 27/0031* (2013.01)

(58) Field of Classification Search
  CPC . G02B 26/101; G02B 26/105; G02B 27/0031
  See application file for complete search history.

(56) References Cited

U.S. PATENT DOCUMENTS

| | | |
|---|---|---|
| 2010/0208319 A1 | 8/2010 | Kessler |
| 2012/0310223 A1 | 12/2012 | Knox et al. |
| 2013/0141695 A1* | 6/2013 | Buckland ............... A61B 3/102 359/663 |
| 2013/0226162 A1 | 8/2013 | Knox et al. |
| 2013/0268072 A1 | 10/2013 | Smith et al. |
| 2015/0126979 A1 | 5/2015 | Knox et al. |
| 2015/0157203 A1 | 6/2015 | Buckland et al. |
| 2015/0335238 A1 | 11/2015 | Buckland et al. |
| 2016/0074967 A1 | 3/2016 | Sahler et al. |
| 2016/0144580 A1* | 5/2016 | Knox ............... B29D 11/00461 606/4 |

FOREIGN PATENT DOCUMENTS

| | | |
|---|---|---|
| WO | 2012166696 A1 | 12/2012 |
| WO | 2015006274 A1 | 1/2015 |
| WO | 2019010345 A1 | 1/2019 |

OTHER PUBLICATIONS

Ding et al. (2008) "Large enhancement of femtosecond laser micromachining speed in dye-doped hydrogel polymers," Optical Express 16(26):21914-21921.

Gandara-Montano et al. (2015) "Femtosecond laser writing of freeform gradient index microlenses in hydrogel-based contact lenses," Optical Materials Express 5(10): 2257-2271.

Rim et al. (2008) "The optical advantages of curved focal plane arrays," Optical Express 16(7): 4965-4971.

Xu, L. et al. (2011) "Lateral gradient index microlenses written in opthalmic hydrogel polymers by femtosecond laser micromachining," Optical Materials Express 1(8):1-9.

* cited by examiner

Field map of the RMS wavefront error across the full 5° field of view.
The maximum error is 0.058 with an average of 0.041 waves at 405 nm.

FIG. 6

OPTICAL DESIGN FOR A TWO-DEGREE-OF-FREEDOM SCANNING SYSTEM WITH A CURVED SAMPLE PLANE

STATEMENT REGARDING FEDERALLY SPONSORED RESEARCH OR DEVELOPMENT

This invention was made with government support under IIP1549700 awarded by National Science Foundation. The government has certain rights in the invention.

FIELD OF THE INVENTION

This invention is for an optical design for a microscope objective and relay system for a two-degree-of-freedom galvanometer scanning system. Two mirrors, which rotate about orthogonal axes are placed at two separate locations in the optical system with a relay step between the mirrors to enable scanning in both directions over the full, curved field.

BACKGROUND OF THE INVENTION

Pulsed lasers operating within specified regimes specially adapted to target optical materials have been demonstrated to produce localized refractive index changes in the optical materials without otherwise damaging the materials in ways that would impair vision. The energy regimes, while above the nonlinear absorption threshold, are typically just below the breakdown thresholds of the optical materials at which significant light scattering or absorption degrades their intended performance.

Femtosecond micro-modification of materials through non-linear absorption is a relatively new technique that can be used to locally change the refractive index of certain materials within the focal region of a high numerical aperture (NA) objective. This process has been shown to be particularly effective in ophthalmic hydrogels, such as those used in contact lenses and intra-ocular lenses (IOLs), but can also be used to change the refractive index of the native cornea without the need for any incisions or material removal (see, e.g., Ding, L., et al., *Large enhancement of femtosecond laser micromachining speed in dye-doped hydrogel polymers*. Optics Express, 2008. 16(26): p. 21914-21921). By scanning the focal region of the objective, it is possible to build a plane of refractive index change, creating a gradient-index (GRIN) lens (see, e.g., Xu, L. and W. H. Knox, *Lateral gradient index microlenses written in ophthalmic hydrogel polymers by femtosecond laser micromachining*. Optical Materials Express, 2011. 1(8): p. 1416-1424). This has been shown creating arbitrary aberration correction over small areas (see, e.g., Gandara-Montano, G. A., et al., *Femtosecond laser writing of freeform gradient index microlenses in hydrogel-based contact lenses*. Optical Materials Express, 2015. 5(10): p. 2257-2271), but becomes much more complicated when moving to sizes required for clinically relevant ophthalmic structures.

An approximately 6.5 mm diameter optical writing zone is required to cover the entire optical zone of the eye for contact lenses and native cornea, but most commercially available objectives of the required NA do not cover that large of a region. In order to cover the entire ophthalmic zone, multiple scanning techniques have been utilized in the past. Two primary scanning techniques have previously been used to accomplish the large required scan area. The first is using a stage to scan the objective directly, requiring no change in the angle entering the objective (see, e.g., Brooks, D. R., et al., *Precision large field scanning system for high numerical aperture lenses and application to femtosecond micromachining of ophthalmic materials*. Review of Scientific Instruments, 2014. 85(6): p. 065107). The second is using a galvanometer to scan over the focal region of the objective then using linear stages to move either the objective or the sample to stitch together multiple scan regions to create a full ophthalmic refractive structure. The direct scanning of the objective has the benefit of simplifying the required optics, but with the downside of a limited maximum scan speed from mechanical dynamics required for precise scans. The galvanometer is limited by the field of commercial objectives, and the stitching often results in extraneous diffraction effects.

Examples of prior disclosures of femtosecond laser applications include US Patent Application Publication No. 2013/0226162 entitled Method for Modifying the Refractive Index of Ocular Tissues, which discloses a laser system for changing the index of refraction of cornea tissue in a living eye for forming of modifying optical elements including Bragg gratings, microlens arrays, zone plates, Fresnel lenses, and combinations thereof. Here wavelengths are preferably between 400 nm and 900 nm, pulse energies are preferably between 0.01 nJ and 10 nJ, pulse duration is preferably between 10 fs and 100 fs, the repetition rate is preferably between 10 MHz and 500 MHz, the numerical aperture is preferably about 0.70 producing about a line width between approximately 0.6 µm to 1.5 µm and a line depth between 0.4 µm to 8 µm, and the scan rate is between approximately 0.1 µm/s to 10 mm/s. US Patent Application Publication No. 2013/0268072 entitled Optical Hydrogel Material with Photosensitizer and Method for Modifying the Refractive Index discloses a method for modifying the refractive index of an optical, hydrogel polymeric material prepared with a photosensitizer particularly for the purposes of enhancing the efficiency of nonlinear absorption and increasing the scan rate at which refractive structure can be formed. Wavelengths are preferably between 650 nm to 950 nm, pulse energies are preferably between 0.05 nJ to 10 nJ, pulse duration is preferably between 4 fs and 100 fs, the repetition rate includes by way of example both 80 MHz and 93 MHz, the numerical aperture is preferably about 0.70 producing about a line width between approximately 0.6 µm to 10.5 µm and a line depth between 1 µm to 4 µm and the scan rate is between approximately 0.1 µm/s to 4 mm/s. US Patent Application Publication No. 2015/0126979 entitled Method for Modifying the Refractive Index of an Optical Material discloses the writing of selected regions of optical hydrogel materials prepared with a hydrophilic monomer following implantation of the prepared material into the eye of the patient. Wavelengths are preferably between 600 nm to 900 nm, pulse energies are preferably between 0.01 nJ to 50 nJ, pulse duration is preferably between 4 fs and 100 fs, the repetition rate includes by way of example 93 MHz, the numerical aperture is preferably about 0.70 producing about a line width between approximately 0.2 µm to 3 µm and a line depth between 0.4 µm to 8 µm, and a demonstrated scan rate is approximately 0.4 µm/s. US Patent Application Publication No. 2015/0378065 entitled Method for Modifying the Refractive Index of an Optical Material and resulting Optical Vision Component, which discloses the writing of GRIN layers in optical polymeric materials. Wavelengths are preferably between 750 nm to 1100 nm, pulse energies are preferably between 0.01 nJ to 20 nJ, pulse duration is preferably between 10 fs and 500 fs, the repetition rate is preferably between 10 MHz and 300 MHz, the numerical aperture is preferably about 0.70 producing about a line width between approximately 0.6 µm to 3 µm and a line depth between 0.4 μm to 8 μm, and the scan rate is between approximately 0.1 mm/s to 10 mm/s. These referenced patent applications are hereby incorporated by reference, particularly as examples for writing refractive structures in optical materials. The US patent application publications referenced above are hereby incorporated by reference as representative background technologies subject to the improvements set forth herein.

All previous writing using this process involved writing flat planes of change, but any ophthalmic device that is placed on the eye must be curved. This means that to write a flat plane of change in a contact lens, it must first be flattened, often resulting in wrinkles and/or strain in the material.

BRIEF SUMMARY OF THE INVENTION

The present disclosure describes an optical system design including an objective designed for femtosecond micro-modification of contact lenses in their native curved configuration, as well as a relay for relaying the galvanometer scanners to the entrance pupil of the objective.

In accordance with one embodiment of the disclosure, an optical system for use with a femtosecond laser writing system is described, comprising:
 a split galvo mirror scanning system including first and second galvo mirrors for causing angular changes to an optical beam of the laser writing system about orthogonal axes;
 an optical relay comprising at least two optical elements between the first and second galvo mirrors; and
 an objective configured for focusing the optical beam to a focal spot in a curved image plane;
 wherein the second galvo mirror is located at an aperture stop before a first optical element of the objective.

In accordance with further embodiments of such optical system, a last optical surface of the objective and the curved image plane may be concentric; the curved image plane may be located between 0 μm and 200 μm below a last optical element of the objective; the locations of the first and second galvo mirrors are at the object and image locations for the optical relay; the first and second galvo mirror angles can be synchronously controlled to direct the focal spot to any location on the curved image plane; the objective has an NA of from about 0.2 to 0.7; the objective has an NA of approximately 0.3; and or the curved image plane has a radius of curvature between 7 mm and 11 mm.

In accordance with a further embodiment of the disclosure, a femtosecond laser writing system is described comprising:
 a femtosecond laser generating an optical beam; a split galvo mirror scanning system including first and second galvo mirrors for causing angular changes to the optical beam about orthogonal axes;
 an optical relay comprising at least two optical elements between the first and second galvo mirrors; and
 an objective configured for focusing the optical beam to a focal spot in a curved image plane;
 wherein the second galvo mirror is located at an aperture stop before a first optical element of the objective.

In accordance with further embodiments of such femtosecond laser writing system, a last optical surface of the objective and the curved image plane may be concentric; the curved image plane may be located between 0 μm and 200 μm below a last optical element of the objective; the locations of the first and second galvo mirrors are at the object and image locations for the optical relay; the first and second galvo mirror angles can be synchronously controlled to direct the focal spot to any location on the curved image plane; the objective has an NA of from about 0.2 to 0.7; the objective has an NA of approximately 0.3; and or the curved image plane has a radius of curvature between 7 mm and 11 mm.

In accordance with a specific embodiment of such femtosecond laser writing system, the optical beam has a Wavelength of 405±3 nm; and the objective is configured to have Effective Focal Length of about 55 mm, a Field of ±5°, an Image size of about 3.38 mm, an Input beam diameter of about 24 mm, and an Image plane curvature of about −8.7 mm.

BRIEF DESCRIPTION OF THE SEVERAL VIEWS OF THE DRAWING(S)

FIG. 6 is a schematic illustration of a microscope objective design which may be employed in accordance with an embodiment of the present disclosure.

DETAILED DESCRIPTION OF THE INVENTION

A desirable scanning solution for femtosecond micro-modification of contact lenses comprises a custom optical solution that covers the entire optical zone using a galvanometer type scanner. In the present disclosure, the micro-modification of a contact lens may be written in its natural curved configuration, which is further advantageous as it has been shown that creating objective lenses for imaging or writing on a curved surface can significantly reduce the required complexity of the objective lenses (see, e.g., Rim, S.-B., et al., *The optical advantages of curved focal plane arrays*. Optics Express, 2008. 16(7): p. 4965-4971).

Figure 1:
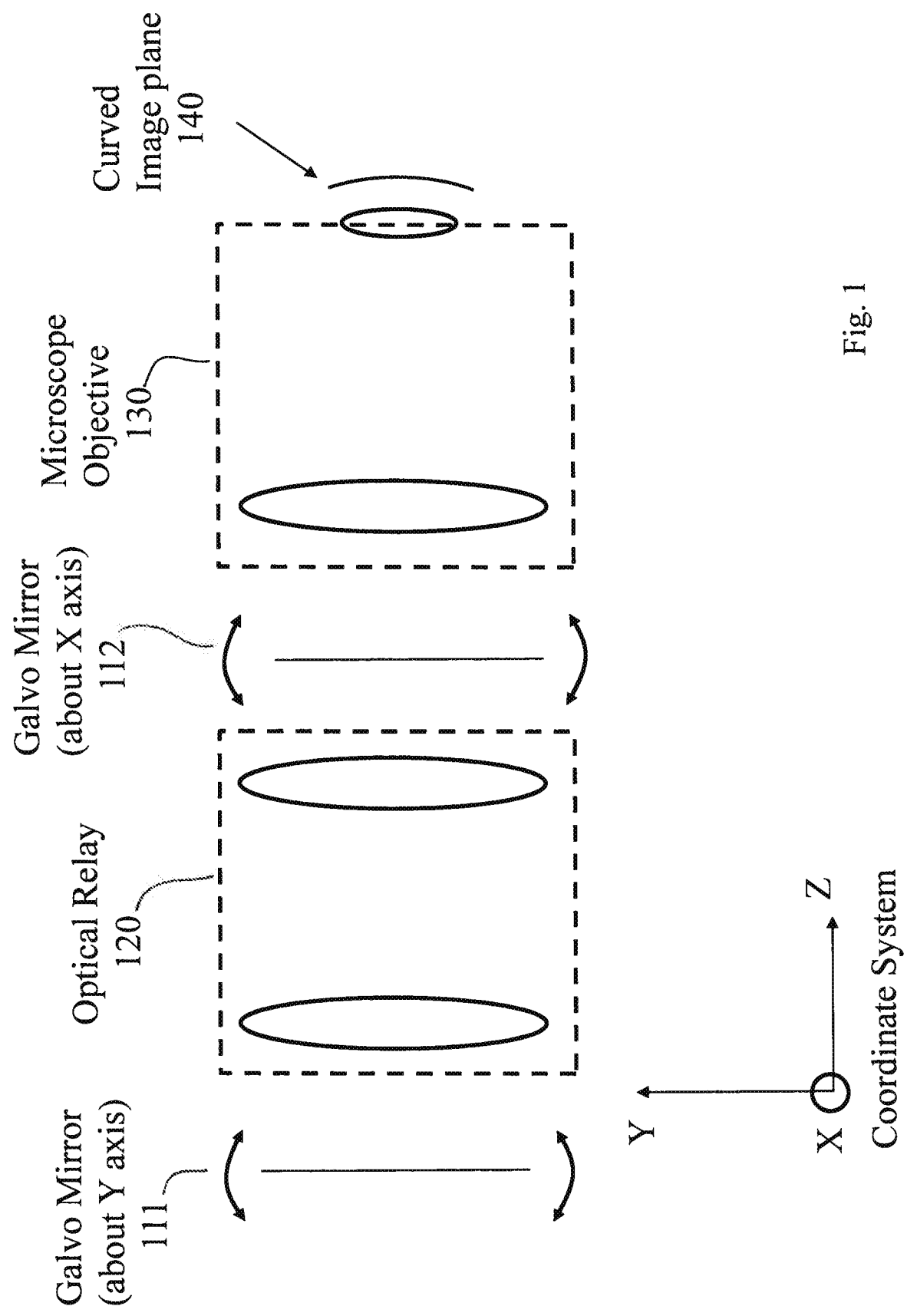
FIG. 1 is a schematic illustration of an optical design for a microscope objective and relay system in accordance with an embodiment of the present disclosure.

This disclosure describes an optical design for a microscope objective and relay system for a two-degree-of-freedom galvanometer scanning system, as schematically illustrated in FIG. 1. First and second galvo mirrors 111 and 112, which rotate about orthogonal axes are placed at two separate locations in the optical system, with an optical relay 120 between the two mirrors. Because the scanning mirrors are split, this reduces the size of the overall relay system. The second mirror 112 is placed at an aperture stop before a first optical element of the microscope objective 130, which allows for scanning the second galvo mirror angle without needing further relay of the image into the microscope objective, thus enabling the system to include only a single relay step while still scanning in both directions over the full field.

Another feature of the system as illustrated in FIG. 1 is that the objective 130 is configured for focusing an optical beam to a focal spot in a curved image plane 140. The field of use of this invention is for ophthalmic devices and in particular contact lenses and intra-ocular lenses. In particular, the described optical system can be used in conjunction with previously disclosed femtosecond laser applications as referenced above. As discussed, a relatively high numerical aperture system has typically been employed, with lasers which operate at wavelengths between 350 nm to 600 nm with femtosecond pulses at a relatively high repetition rate (~80 MHz). Alternatively, higher wavelength lasers may be employed, i.e. above 600 nm and into the near infrared, and in particular from about 600 to 1200 nm, more preferably from about 750 to 950 nm, particularly when used in combination with a photosensitizer as disclosed in US 2009/0287306 and US 2012/0310340, the disclosure of which is also incorporated by reference herein. The optical design is such that the femtosecond laser writing process can occur over large fields using a 2-dimensional galvanometer system where scanning over fields >5 mm is typically complex to design and costly to manufacture and align as discussed above. In the present disclosed system, we scan the beam for micromodification over the full field through the back of the sample (e.g., contact lens), which typically has a radius of curvature between 7 mm and 11 mm to match the radius of curvature of the eye. The optical design with a curved writing plane allows us to use relatively few optical elements and means that we can write in a contact lens without needing it to be flattened first. This reduces stress on the contact lens (and other samples) which can potentially affect the writing process.

Figure 2:
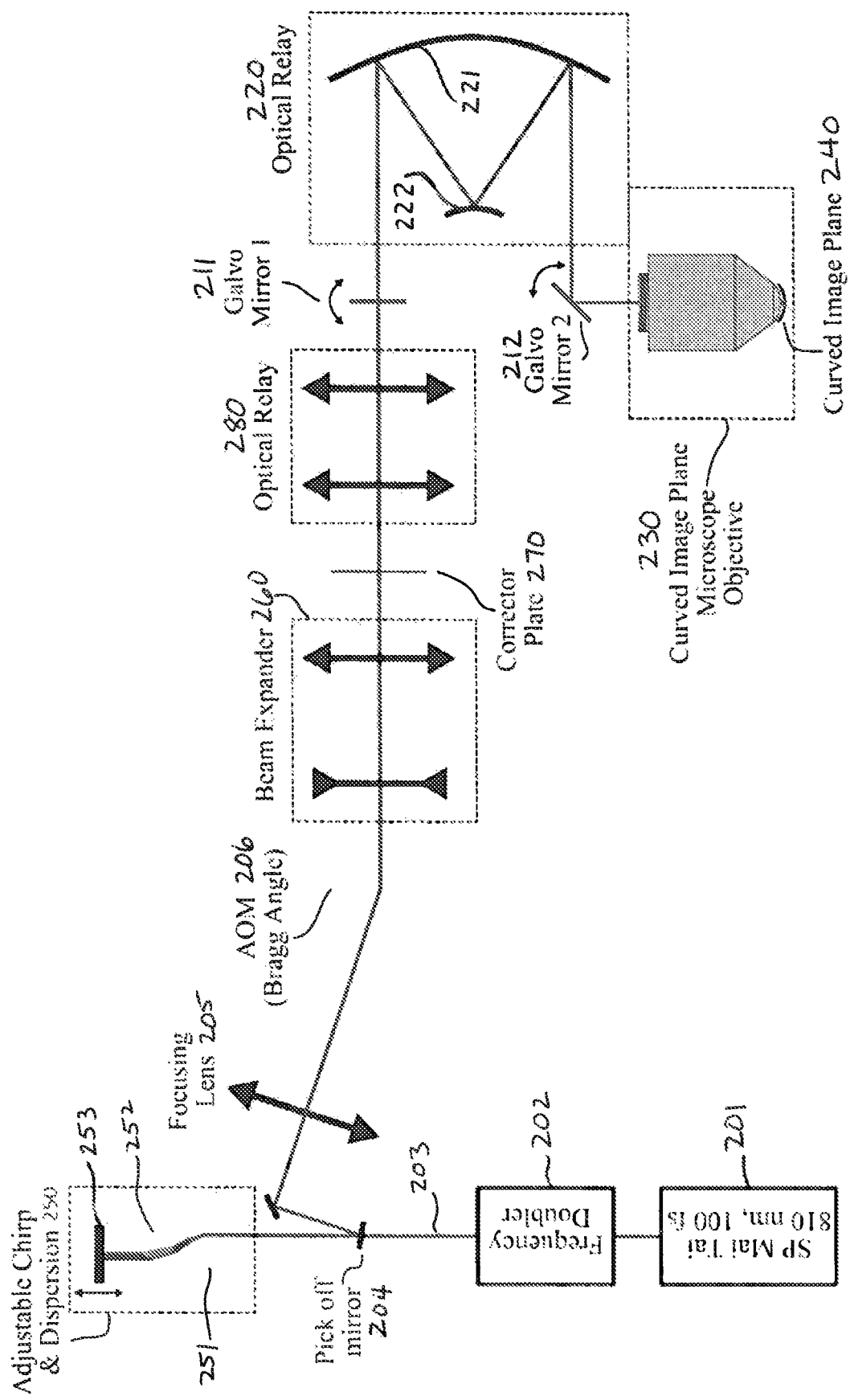
FIG. 2 is a schematic illustration of femtosecond laser writing system in accordance with an embodiment of the present disclosure.

A more detailed exemplary, non-limiting example of the described optical system for use with a femtosecond laser writing system for irradiating an optical, polymeric material with a laser to modify the refractive index of the material in select regions is illustrated in schematic drawing FIG. 2.

A laser source comprises a Spectra-Physics MaiTai laser 201 operated at 810 nm, 100 fs and a frequency-doubler 202 generating laser beam 203, which traverses just past a pick-off mirror 204. The laser source can be fashioned as mode-locked Ti:Sapphire laser (e.g., a Spectra-Physics Ti:Sapphire oscillator such as MaiTai-HP available from Spectra-Physics, a Newport company, in Santa Clara, California) pumped by a frequency-doubled Nd:YVO4 laser. The laser can generate, for example, a succession of pulses of up to 3 W average power, a 110 fs pulse width, and an 80 MHz repetition rate or up to 1 W average power, a 160 fs pulse width and an 80 MHz repetition rate at around 400 nm frequency-doubled wavelengths. Of course, other lasers can be used or optimized for use with writing refractive index changes into different optical materials in accordance with the marginal thresholds of the materials for undergoing localized refractive index changes without also undergoing optically induced damage such as significant light scattering or absorption that degrade their intended performance. The optical materials include ophthalmic hydrogel polymers (used in contact lenses and intraocular lenses) and cornea tissue (both excised and in vivo) as well as other ophthalmic materials that are naturally occurring or synthetically produced.

Generally, for the purpose of writing refractive index structures in such optical materials, with pulsed laser sources, the succession of pulses preferably have a pulse width between 8 fs and 500 fs, a pulse energy between 0.01 nJ and 10 nJ, a repetition rate between 1 MHz and 500 MHz, and a nominal wavelength between 400 nm and 1100 nm. These parameters are also tied to the focal spot size and the scanning rate at which the focal spot is moved relative to the optical material. For writing refractive index changes over larger volumes, both the focal spot size and the scanning rate are increased as much as practically possible in coordination with the other parameters that are set to operate in an energy regime just below the damage threshold of the material. Scanning speeds up to 10 m/s, or even greater, are contemplated.

To compensate for positive dispersion introduced by the focusing objective, an adjustable chirp and dispersion unit 250 comprises two prisms 251 and 252 and one ending mirror 253, forming a two-pass, one-prism pair configuration, is employed. Other options for compensating dispersion include using multiple prism pairs, grating pairs, and/or Gires-Tournois Interferometer mirrors. The laser beam then passes through focusing lens 205 and Bragg Angle acousto-optic modulator (AOM) 206. As described in the above-mentioned references, custom refractive structures can be written into ophthalmic materials by varying the RI across a 3-dimensional region using a focused laser. The index change created in the focal point can be quantitatively modeled as a function of the focal point velocity and intensity of the laser source. Intensity control is a better variable than velocity for rapidly and predictably modulating index; in this exemplary embodiment, an acousto-optic modulator (AOM) 206 was used due to its rapid rise time (on the order of 10 ns/mm beam waist). Specifically, the system may use an Isomet Ml 133-aQ80L-1.5 AOM with an Isomet 532C-7 driver. The AOM modulates intensity by diffracting an amount of light proportional to the acoustic wave amplitude into the first diffraction order. The percentage of incident light deposited into the first diffraction order is known as the diffraction efficiency. The Isomet AOM achieves a peak diffraction efficiency of about 72% after focusing the beam into the glass, centering this focal point in the glass, setting the proper Bragg angle, aligning the glass to the polarization of the laser, and tuning the driver power. Thus the intensity striking the target can be modulated between about 0% and about 72% of the source's base intensity.

Beam 203 then passes through a beam expander 260 allowing for expanding and recollimation of the laser through AOM 206 to beam diameters up to 30 mm, corrector plate 270 to adjust the optical aberrations of the beam in the focal spot, and an optical relay 280 that relays the corrector plate onto the object play of the optical relay 220 to the first split galvo mirror 211 of the optical system of the present disclosure. Optical relay 220 between the first and second galvo mirrors 211 and 212 comprises first and second optical reflective mirrors 221 and 222. Second galvo mirror 212 then directs beam 203 to microscope objective 230, which is configured to focus the optical beam to a focal spot in curved image plane 240.

In one embodiment, the desired specifications for the described optical system for use with a femtosecond laser writing system include a full, circular image size of at least about 6.5 mm diameter to accommodate the entire optical zone of the eye, a wavelength of 405±3 nm for the bandwidth of the femtosecond laser (a frequency doubled Ti:Sapphire), and an NA of approximately 0.3 with water immersion. To ease size requirements of the relay, the field angle may be made to be ±5°, resulting in a required focal length of 55 mm to achieve the necessary image size. Since the wavelength is at the lower end of the visible range, care should be taken to ensure that the transmission of the resulting objective is not below 80%. The transmitted power over the field should be constant to within 90%. Small power changes over the field can be corrected using a calibration. As aberrations increase off-axis, the writing efficiency may drop. Power accordingly may be adjusted as a function of field angle during a scan to keep constant writing parameters. The preferred performance specification is <0.07 waves RMS, more preferably <0.05 waves RMS to be considered diffraction limited as designed across all fields.

Figure 3:
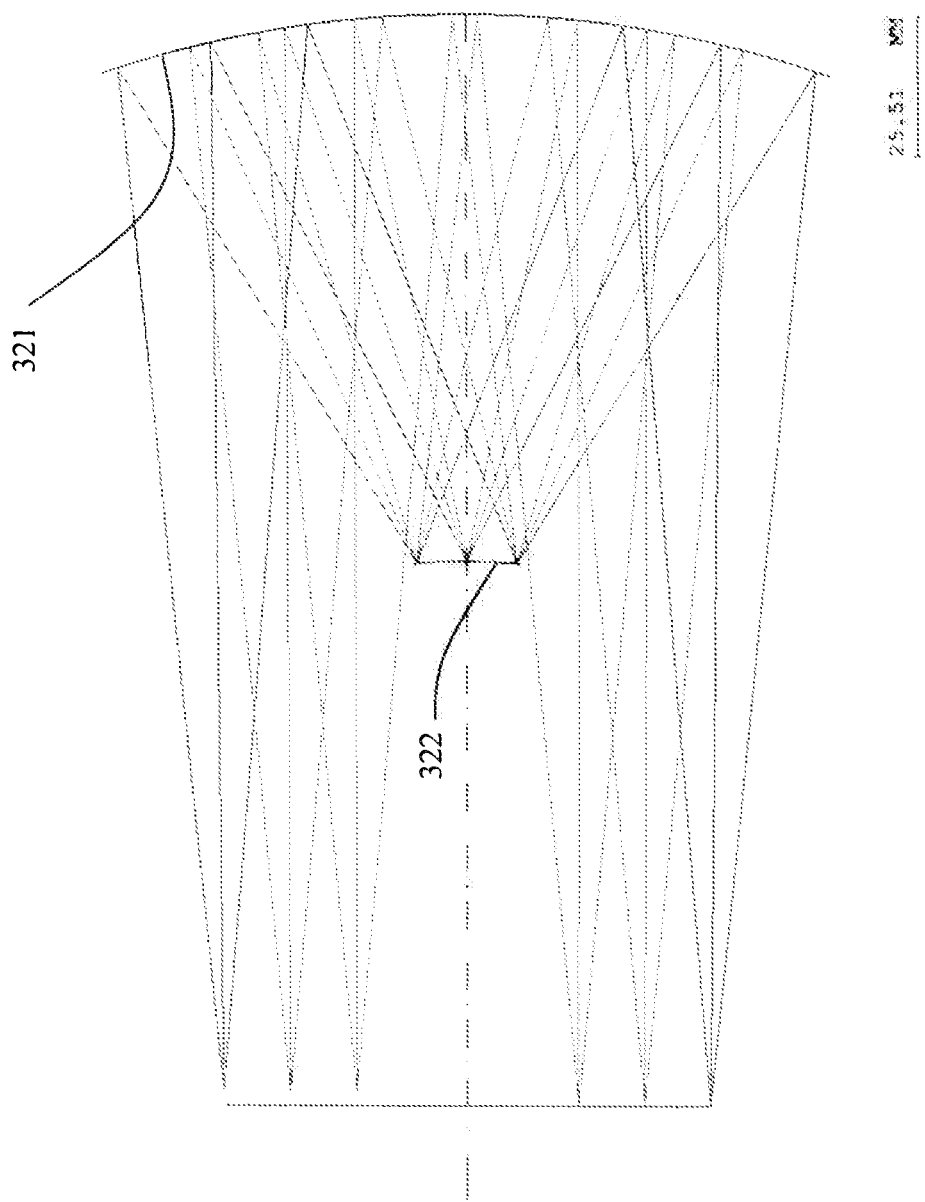
FIG. 3 is a schematic illustration of an optical relay which may be employed in accordance with an embodiment of the present disclosure.

FIG. 3 illustrates an embodiment of an optical relay which may be positioned between the split galvo mirrors of an optical system of the present disclosure, with $1^{st}$ and $2^{nd}$ mirrors 321 and 322, which may be positioned between galvo mirrors positioned at stops before and after the optical relay 220 as shown in FIG. 2. First mirror 321 has a radius of curvature of −200.2843 mm, a semi-aperture of 63.1626 mm, and is a sphere with following parameters: A: 0.129422E-09; B: −0.107426E-12; C: 0.496969E-17. Second mirror 322 has a radius of curvature of −101.8396 mm, a semi-aperture of 9.0161 mm, and is aspheric with following parameters: A: −0.945356E-08; B: −0.161437E-09; C: 0.113926E-11. The Object distance is 197.3647 mm, the mirror separation is 100.1422 mm, and the Image distance is −200.06 mm.

Figure 4:
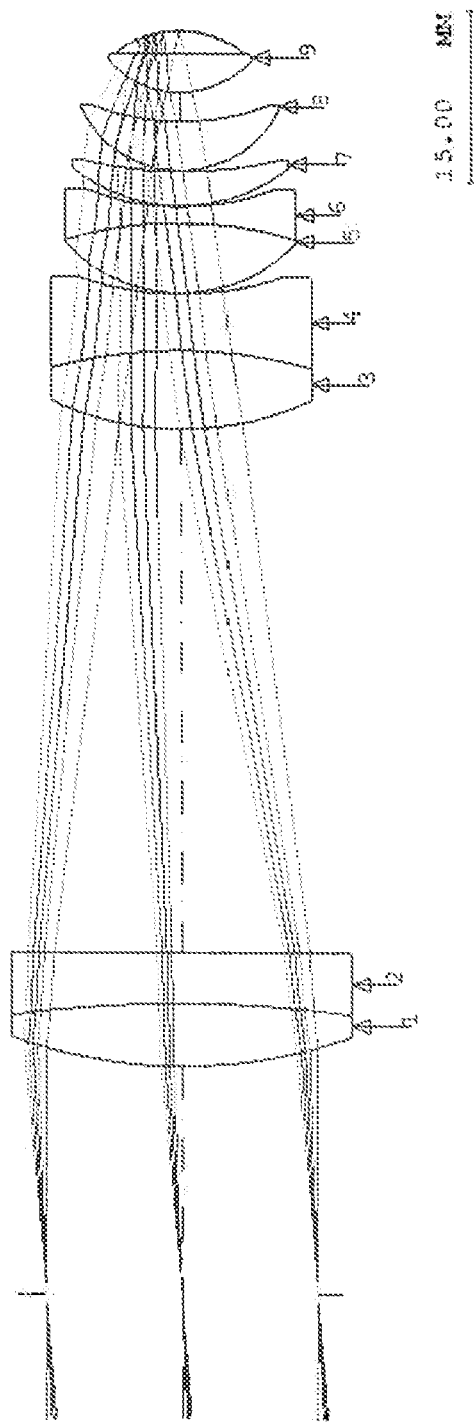
FIG. 4 is a schematic illustration of a microscope objective design which may be employed in accordance with an embodiment of the present disclosure.
Figure 5:
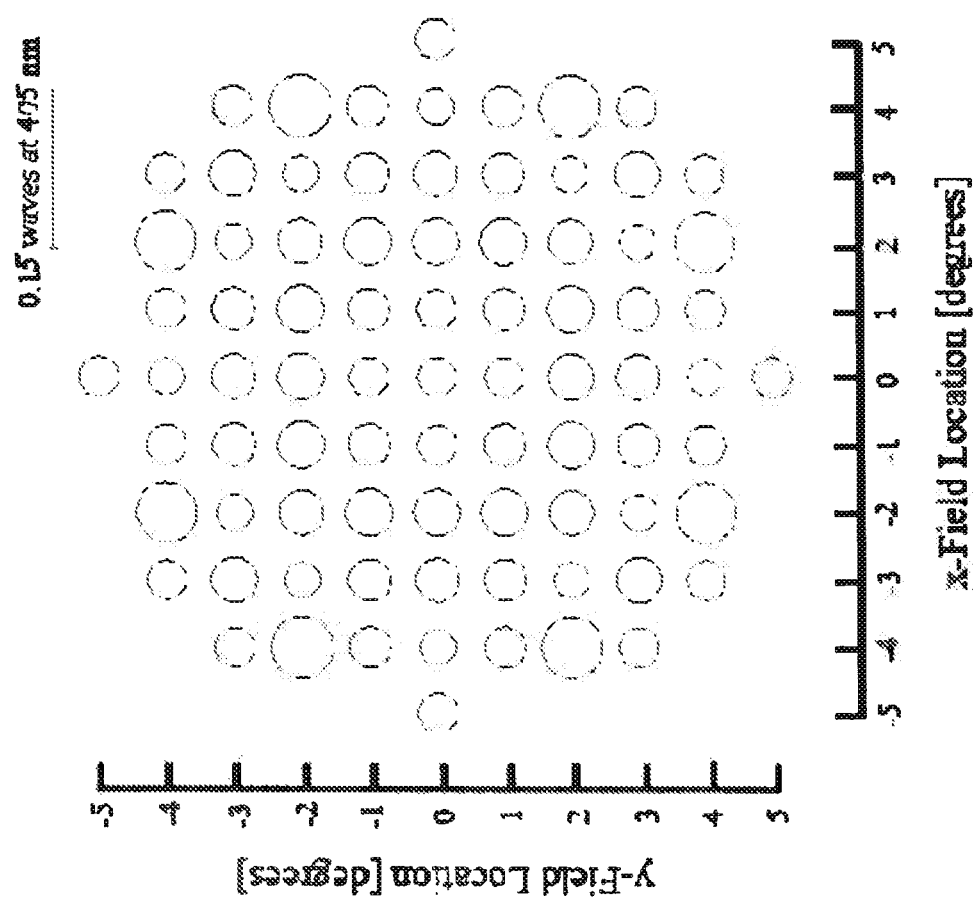
FIG. 5 is a full field map of the RMS wavefront error obtained for the embodiment of FIG. 4.

FIG. 4 illustrates an embodiment of the microscope objective design which may be employed in the present optical system, wherein in such embodiment the objective comprises six separate optical elements. The first three elements are doublets (1,2; 3,4; 5,6), followed by three singlets (7, 8, 9). The image plane is immersed in water then focused 0.05 mm into the contact lens material. The base curve radius of the contact lens was assumed to be 9 mm. The stop was placed 20 mm in front of the first lens element to allow for a single axis galvanometer stage (second galvo mirror 212 in FIG. 2). The first galvo mirror 211 for the perpendicular scan axis will be relayed to the plane of the second galvo with a reflective relay system as shown in FIGS. 2 and 3. The design of FIG. 4 was able to meet the performance specifications demanded by the applications. A full field map of the RMS wavefront error is shown in FIG. 5.

In accordance with further embodiments, the microscope objective may be configured for use in a system meeting the following specifications:

Effective Focal Length: 55 mm

Wavelength: 405±3 nm

Field: ±5°

Image: 3.38 mm (half size of writeable area)

Input beam diameter: 24 mm

Image plane curvature: −8.7 mm (could be modified to adjust to different back radius of curvature contact lenses)

Figure 6:
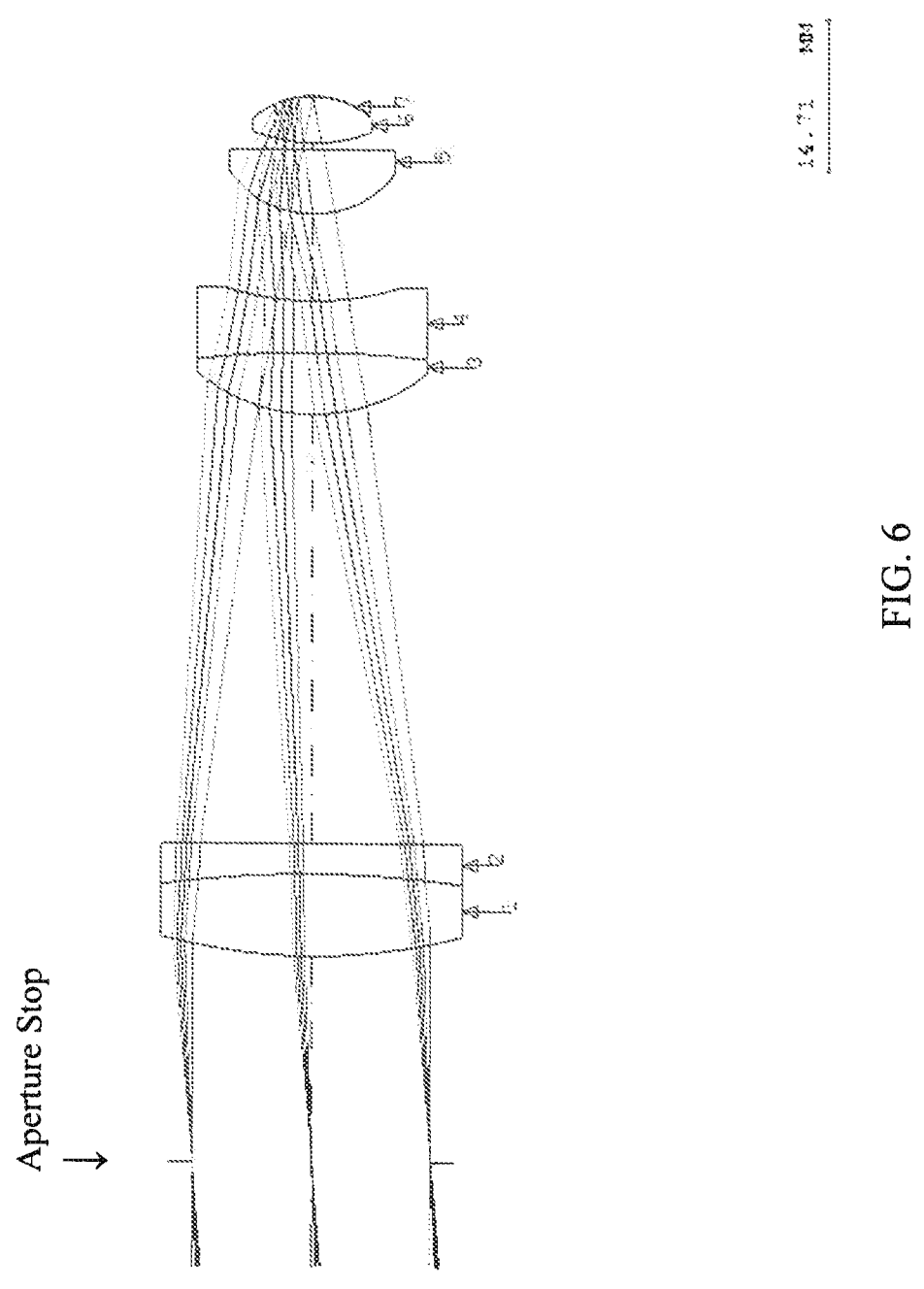

In a further embodiment, the last optical surface of the objective may be configured to match the curvature of the sample into which the curved image plane is to be written, enabling a further matching curved image plan to be written in to the sample. A microscope objective in accordance with such an embodiment is shown in FIG. 6, wherein the objective in this instance comprises four separate optical elements; the first two elements are doublets (1,2; 3,4), followed by two singlets (5, 6), wherein the last optical surface of the objective matches the curvature of a contact lens (7) positioned directly thereon. The curved image plane may again be focused 0.05 mm into the contact lens material. The first and second galvo mirrors and aperture stops may be placed similarly as described above and as shown in FIG. 2. The embodiment of FIG. 6 includes the following lens parameters:

TABLE 1

| Element | Radius 1 [mm] | Radius 2 [mm] | Thickness [mm] | Air Space Post-lens [mm] | Material | Semi-Aperture [mm] |
|---|---|---|---|---|---|---|
| Lens 1 | 56.0499 | −103.680 | 8.00 | cement | N-BAF10 | 13.3185 |
| Lens 2 | −103.6797 | 1304.406 | 3 | 41.8923 | S-NBH56 | 13.0446 |
| Lens 3 | 17.1167 | −90.799 | 6 | cement | N-PK51 | 10.0505 |
| Lens 4 | −90.7993 | 27.105 | 5 | 8.5147 | S-LAH58 | 9.4204 |
| Lens 5 | 10.0377* | 854.3022 | 6.3 | 1.4035 | S-FSL5 | 7.0954 |
| Lens 6 | 14.791 | −8.7 | 4.5477 | contact lens | N-LAK22 | 4.9576 |
| Contact lens 7 | −8.7 | N/A |  | Image | Acuvue2 | 3.3771 |

*Asphere: A: 0.387949E-05; B: 0.452833E-07; C: 0.166402E-08

Figure 7:
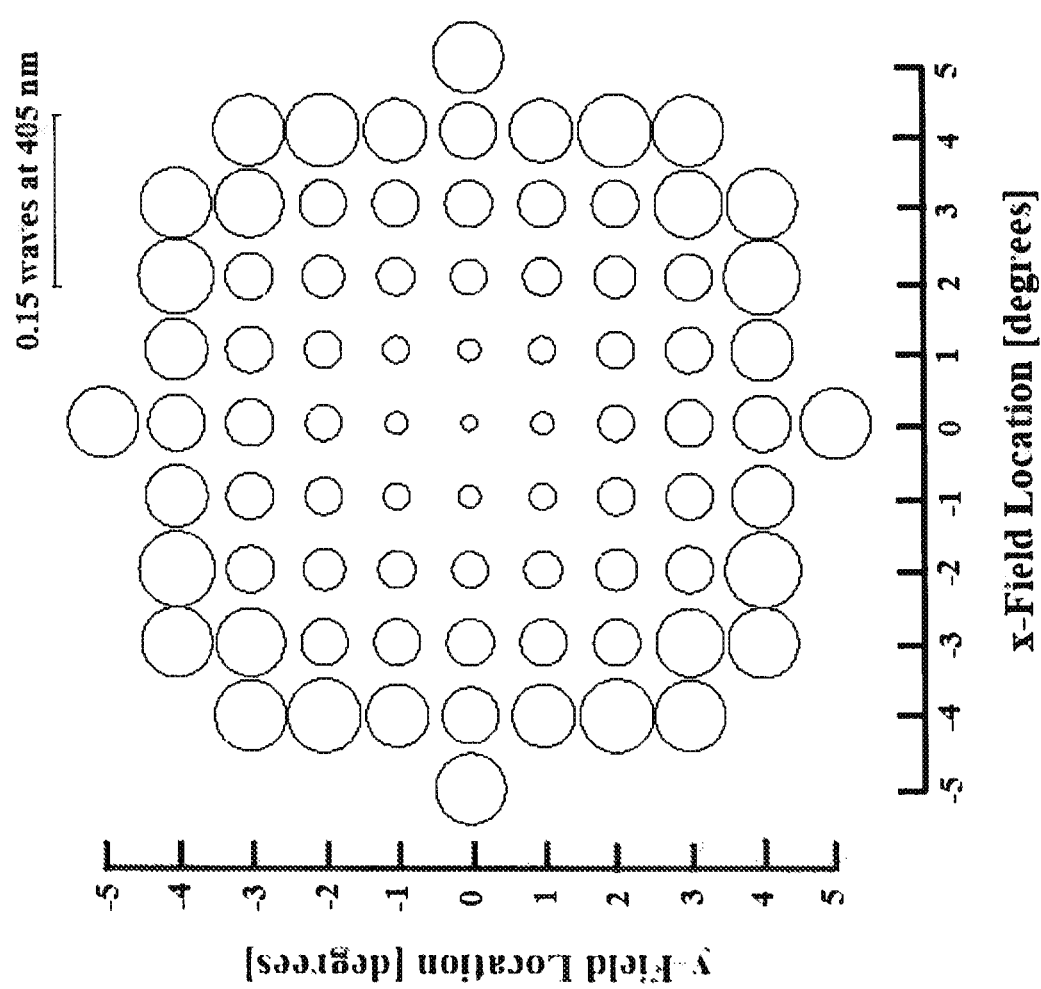
FIG. 7 is a full field map of the RMS wavefront error obtained for the embodiment of FIG. 6.

The design of FIG. 6 was able to meet the performance specifications demanded by the applications. A full field map of the RMS wavefront error is shown in FIG. 7.

In a further embodiment similar to that of FIG. 6, in which the last optical surface of the objective is configured to match the curvature of the sample into which the curved image plane is to be written, the system may be optimized for a larger diameter writing area of 7.0 mm (semi-aperture of 3.5 mm), with a NA of 0.3 and field of ±5° by employing similar sets of optical elements but with lenses having the following lens parameters:

TABLE 2

| Element | Radius 1 [mm] | Radius 2 [mm] | Thickness [mm] | Air Space Post-lens [mm] | Material | Semi-Aperture [mm] |
|---|---|---|---|---|---|---|
| Galvo Mirror/ Aperture Stop |  |  | 58.321 |  |  | 11.369 |
| Lens 1 | 51.015 | −66.812 | 9.922 | cement | N-BAF10 | 16.718 |
| Lens 2 | −66.812 | −198.630 | 3.610 | 12.552 | S-NBH56 | 16.257 |

TABLE 2-continued

| Element | Radius 1 [mm] | Radius 2 [mm] | Thickness [mm] | Air Space Post-lens [mm] | Material | Semi-Aperture [mm] |
|---|---|---|---|---|---|---|
| Lens 3 | 25.170 | −155.595 | 5.462 | cement | N-PK51 | 13.089 |
| Lens 4 | −155.595 | 43.753 | 8.000 | 18.606 | S-LAH58 | 12.687 |
| Lens 5 | 16.395 | −188.432 | 2.000 | 3.079 | S-FSL5 | 6.386 |
| Lens 6 | 9.026 | −8.7 | 2.953 | contact lens | N-LAK22 | 4.161 |
| Contact lens 7 | −8.700 | N/A | | Image | contact lens | 3.500 |

The curved image plane may again be focused 0.05 mm into the contact lens material. The first and second galvo mirrors and aperture stops may be placed similarly as described above and as shown in FIG. 2. The design with lens elements according to Table 2 is again able to meet performance specifications demanded by the applications, but with performance slightly worse than that of the FIG. 6/Table 1 embodiment at the edge of the field. In general, the NA, image diameter and field parameters can be re-optimized for different contact lens Back Radius of Curvatures, different contact lens pupil diameters, writing depth in the contact lens, and contact lens materials. In all cases, providing the system stop before the first lens in the objective system is beneficial to the design.

A new microscope objective and galvo scanning system has been designed to work for the femtosecond micro-modification of contact lenses in their natively curved geometry. The design meets all requirements of the described application and represents an advancement of the femtosecond micro-modification technology toward commercial viability, enabling high-speed writing of custom refractive correction in contact lenses without the need for applanation.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An optical system for use with a femtosecond laser writing system, comprising:
   (a) a split galvo mirror scanning system including first and second galvo mirrors for causing angular changes to an optical beam of the laser writing system about orthogonal axes;
   (b) an optical relay comprising at least two optical elements between the first and second galvo mirrors; and
   (c) an objective configured for focusing the optical beam to a focal spot in a concave curved image plane;
   wherein the second galvo mirror is located at an aperture stop before a first optical element of the objective, and wherein the optical system is further configured for forwarding an optical beam of the laser writing system directly from the aperture stop at which the second galvo mirror is located to the first optical element of the objective without further relay of a laser image into the objective.

2. The optical system of claim 1 wherein a last optical surface of the objective and the concave curved image plane are concentric.

3. The optical system of claim 1 wherein the concave curved image plane is located between 0 μm and 200 μm below a last optical element of the objective.

4. The optical system of claim 1 wherein the locations of the first and second galvo mirrors are at the object and image locations for the optical relay.

5. The optical system of claim 4 wherein the first and second galvo mirror angles can be synchronously controlled to direct the focal spot to any location on the concave curved image plane.

6. The optical system of claim 1 wherein the objective has an NA of from about 0.2 to 0.7.

7. The optical system of claim 6, wherein the objective has an NA of approximately 0.3.

8. The optical system of claim 1 wherein the concave curved image plane has a radius of curvature between 7 mm and 11 mm.

9. The optical system of claim 1 wherein the objective is configured for focusing the optical beam through a concave back surface of a curved contact lens to focal spots in a concave curved image plane in the curved contact lens.

10. A femtosecond laser writing system comprising:
    (a) a femtosecond laser generating an optical beam;
    (b) a split galvo mirror scanning system including first and second galvo mirrors for causing angular changes to the optical beam about orthogonal axes;
    (c) an optical relay comprising at least two optical elements between the first and second galvo mirrors; and
    (d) an objective configured for focusing the optical beam to a focal spot in a concave curved image plane;
    wherein the second galvo mirror is located at an aperture stop before a first optical element of the objective, and wherein the system is further configured for forwarding the optical beam of the laser writing system directly from the aperture stop at which the second galvo mirror is located to the first optical element of the objective without further relay of a laser image into the objective.

11. The femtosecond laser writing system of claim 10 wherein a last optical surface of the objective and the concave curved image plane are concentric.

12. The femtosecond laser writing system of claim 10 wherein the concave curved image plane is located between 0 μm and 200 μm below a last optical element of the objective.

13. The femtosecond laser writing system of claim 10 wherein the locations of the first and second galvo mirrors are at the object and image locations for the optical relay.

14. The femtosecond laser writing system of claim 13 wherein the first and second galvo mirror angles can be synchronously controlled to direct the focal spot to any location on the concave curved image plane.

15. The femtosecond laser writing system of claim 10 wherein the objective has an NA of from about 0.2 to 0.7.

16. The femtosecond laser writing system of claim 15, wherein the objective has an NA of approximately 0.3.

17. The femtosecond laser writing system of claim 10, wherein the concave curved image plane has a radius of curvature between 7 mm and 11 mm.

18. The femtosecond laser writing system of claim 17, wherein the optical beam has a Wavelength of 405±3 nm; and the objective is configured to have Effective Focal Length of about 55 mm, a Field of ±5°, an Image size of about 3.38 mm, an Input beam diameter of about 24 mm, and an Image plane curvature of about −8.7 mm.

19. The femtosecond laser writing system of claim 10 wherein the objective is configured for focusing the optical beam through a concave back surface of a curved contact lens to focal spots in a concave curved image plane in the curved contact lens.

* * * * *